(12) United States Patent
Borthakur

(10) Patent No.: US 10,445,134 B2
(45) Date of Patent: Oct. 15, 2019

(54) IDENTIFYING CANDIDATE WORKLOADS FOR MIGRATION

(71) Applicant: Amazon Technologies, Inc., Reno, NV (US)

(72) Inventor: Apolak Borthakur, Palo Alto, CA (US)

(73) Assignee: Amazon Technologies, Inc., Seattle, WA (US)

( * ) Notice: Subject to any disclaimer, the term of this patent is extended or adjusted under 35 U.S.C. 154(b) by 164 days.

(21) Appl. No.: 14/295,232

(22) Filed: Jun. 3, 2014

(65) Prior Publication Data

US 2015/0347183 A1    Dec. 3, 2015

(51) Int. Cl.
*G06F 9/48* (2006.01)
*G06F 9/50* (2006.01)

(52) U.S. Cl.
CPC .......... *G06F 9/4856* (2013.01); *G06F 9/5088* (2013.01)

(58) Field of Classification Search
None
See application file for complete search history.

(56) References Cited

U.S. PATENT DOCUMENTS

| | | | | |
|---|---|---|---|---|
| 7,941,510 B1* | 5/2011 | Tormasov | ........... | G06F 11/3006 709/220 |
| 2005/0267929 A1* | 12/2005 | Kitamura | ................ | G06F 3/061 709/201 |
| 2008/0222025 A1* | 9/2008 | Fellenstein | ............ | G06Q 10/06 705/37 |
| 2011/0047554 A1 | 2/2011 | Lakshmanan et al. | | |
| 2012/0284408 A1* | 11/2012 | Dutta | .................... | G06F 9/5066 709/226 |
| 2013/0104136 A1* | 4/2013 | Brech | ................... | G06F 9/4893 718/102 |
| 2013/0246606 A1* | 9/2013 | Branch | ............... | H04L 41/0853 709/224 |
| 2013/0339419 A1 | 12/2013 | Emaru | | |

(Continued)

FOREIGN PATENT DOCUMENTS

| | | |
|---|---|---|
| WO | WO2014000274 | 1/2014 |
| WO | WO2014047073 | 3/2014 |

OTHER PUBLICATIONS

International Search Report and Written Opinion dated Sep. 24, 2015, International Patent Application No. PCT/US2015/033399, filed May 29, 2015.

*Primary Examiner* — Lewis A Bullock, Jr.
*Assistant Examiner* — Bruce S Ashley
(74) *Attorney, Agent, or Firm* — Davis Wright Tremaine LLP

(57) ABSTRACT

Techniques for identifying a candidate workload which may be a suitable candidate for migration from a first location to a second location are described herein. A set of suitability measurements associated with a computer system resource operating in the first location is received, the set of suitability measurements including, for example, resource usage values for one or more resources associated with the workload. Based at least in part on one or more statistical calculations on the set of suitability measurements exceeding one or more thresholds, recommendations are made about whether to migrate the workload from the first location to the second location.

21 Claims, 9 Drawing Sheets

(56) References Cited

U.S. PATENT DOCUMENTS

| | | | | |
|---|---|---|---|---|
| 2014/0164624 A1* | 6/2014 | Ames | ................. | G06F 9/45558 |
| | | | | 709/226 |
| 2014/0324862 A1* | 10/2014 | Bingham | .......... | G06F 17/30572 |
| | | | | 707/737 |
| 2015/0052250 A1* | 2/2015 | Doganata | ................ | H04L 47/78 |
| | | | | 709/226 |

* cited by examiner

IDENTIFYING CANDIDATE WORKLOADS FOR MIGRATION

BACKGROUND

Computer system services are frequently implemented as collections of computer system entities operating collectively on one or more computer systems. The entities may utilize computer system resources including, but not limited to, processors, memory and storage as well as applications, processes and other such executable code running thereon. As access to computer system services increases, new resources may be made available to handle the increased resource demands and to avoid system slowdowns. Such dynamic changes in resource requirements may be problematic in customer datacenter environments with a fixed or finite collection of resources. If the customer datacenter environment is configured with adequate resources to handle the highest workload, costly resources may remain idle and unused while resource requirements are low. Conversely, if the customer datacenter environment is configured with a lesser amount of resources, the resources will be inadequate when workload demands increase. Lack of available resources during peak workload times may lead to reduced system performance, system outages and system failures and may significantly degrade the user experience.

One approach to addressing this cost versus performance tradeoff is that a customer may attempt to utilize system analysis tools and/or cost of ownership tools to analyze workloads. This analysis may be used to determine whether those workloads may be suitable candidates for migration to more dynamically scalable computing resource service provider environments. A potential disadvantage of conventional tools is that they generally do not provide metrics to enable identification of good candidate workloads and, as a result, a customer may attempt analysis and/or migration of workloads that are not optimally suited for such migration.

BRIEF DESCRIPTION OF THE DRAWINGS

Various embodiments in accordance with the present disclosure will be described with reference to the drawings, in which.

DETAILED DESCRIPTION

Figure 1:
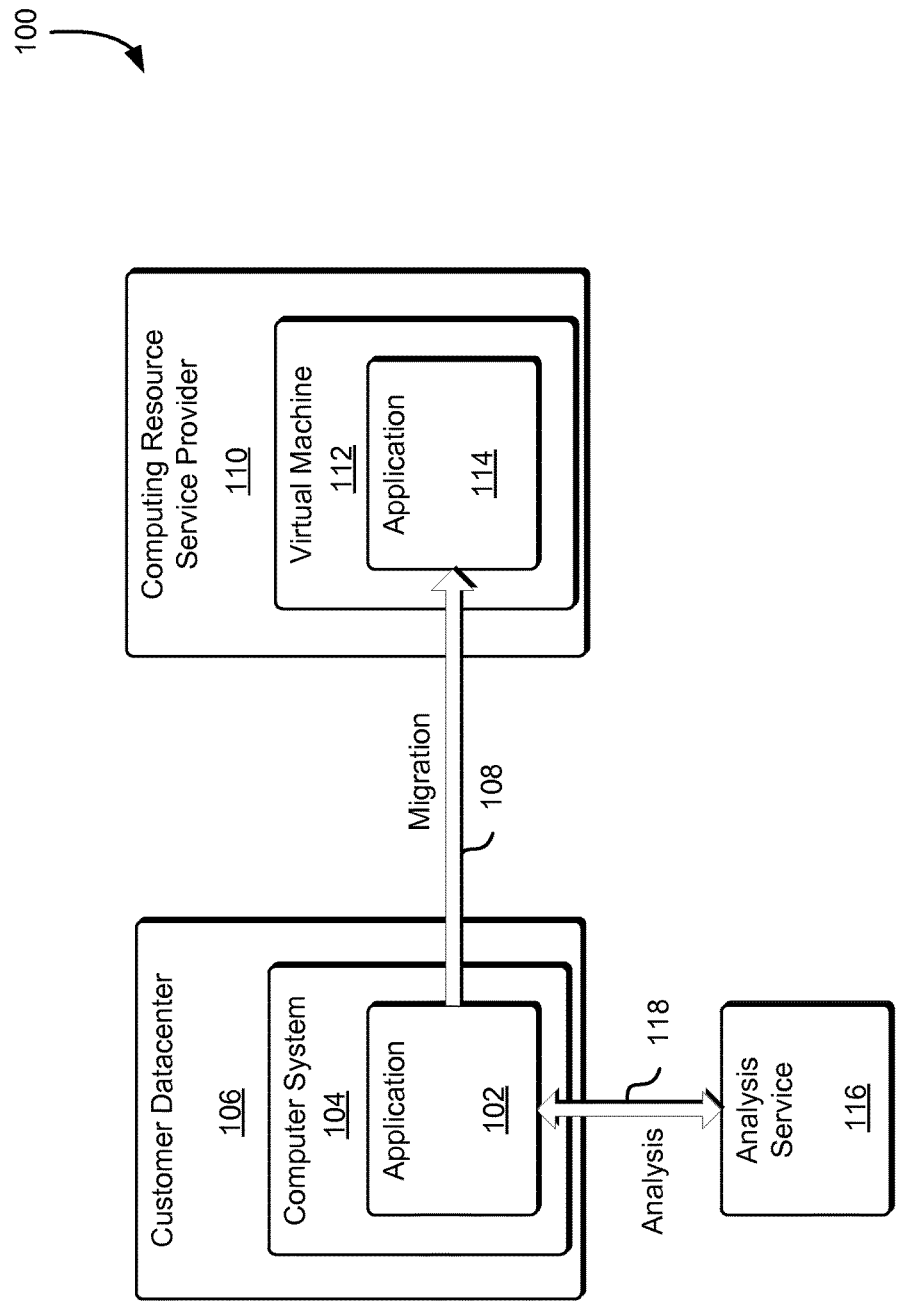
FIG. 1 illustrates an example environment where an application may be identified as a suitable candidate for migration in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include methods, systems and processes for analyzing computer system services and for identifying candidate workloads to migrate from customer datacenter environments to computing resource service provider environments. In particular, techniques are disclosed for utilizing computer system capabilities to analyze resource usage for workloads associated with computer system services, to use that analysis to identify candidate workloads that may at least be partially migrated from customer datacenter environments to a computing resource service provider environments, to perform one or more total cost of ownership (or return on investment) analyses of the computer systems as deployed in a customer datacenter environment and as deployed in a computing resource service provider environment, to make one or more migrations regarding migration and to perform said migration. As used herein, the term "workload" may refer to a collection of one or more resources associated with a computer system and/or may refer to a measure of such resources.

Resource usage measurements (also referred to herein as "load" or "load measurements") may be gathered for resources including, but not limited to, central processing unit ("CPU") usage, memory usage, disk input and output ("I/O") usage and other such resources. One or more metrics (also referred to herein as "scores") associated with these resource measurements may be determined, based at least in part on the measurements. In some embodiments, one or more sets of resource usage measurements may be included in a resource usage profile which may include collections of resource usage measurements. In some embodiments, a resource usage profile may include and/or have calculated one or more of the resource usage metrics that may be calculated using one or more statistical calculation techniques. For example, a mean (or average) value may be computed for the resource usage over the course of the measured time period and, in some embodiments, may be included in a resource usage profile. A standard deviation may also be computed based on the mean, which may provide a measurement of the variation of the resource usage from the mean and which may also be included in a resource usage profile. A standard deviation may be scaled and made unitless (converted into a simple numeric value, also known as a calculation of variance) by dividing the standard deviation by the mean value as described herein below.

Other calculations, including other statistical calculations, may be used to produce the one or more resource usage metrics. For example, load value may be measured as a percentage of maximum load and a calculation may be made comparing that percentage to an optimal percentage as determined by known optimal usage profiles. Similarly, a variance may be calculated by computing the average gradient (or slope) of a graph of resource usage values or by comparing the absolute value of the difference of the resource usage values to an optimal usage values. Resource usage values may also be recorded and/or stored as a single numerical value, using, for example, an exponentially decaying average which more heavily weights recent values and less heavily weights older values. As may be contemplated, the types of statistical calculations that may be used to determine the suitability of a workload for migration described herein are illustrative examples, and other types of statistical calculations that may be used to determine the suitability of a workload for migration may be considered as within the scope of the present disclosure.

The suitability of a workload for migration may be determined based at least in part on the one or more metrics associated with the resource measurements. The suitability of a workload for migration may also be determined by calculating one or more migration advantage scores. A migration advantage score is a score that is usable to determine whether it is advantageous to migrate a workload from one environment to another. A migration advantage score may be based at least in part on a total cost of ownership ("TCO") calculation, or on a return on investment ("ROI") calculation and/or on some other such calculation. A TCO may be calculated for the workload as hosted in the customer datacenter environment based on hardware costs, software costs, power costs, maintenance costs, personnel costs and/or other such costs. A cost may also be calculated for workload as hosted in the computing resource service provider environment. In some embodiments, such a cost may be provided by the computing resource service provider as a service associated with hosting workloads. An ROI may be calculated by comparing the TCO for operating the workload within the customer datacenter environment to costs for operating the workload within a computing resource service provider environment.

In some embodiments, the one or more metrics associated with the resource metrics (also referred to herein as "suitability metrics") may be combined with the one or more migration advantage scores to produce a migration suitability score. For example, a workload with high suitability metric and a high migration advantage score as a result of, for example, a high ROI that may result from performing such a migration, may have a high migration suitability score and thus may be identified as a good candidate for migration. A workload with high suitability metrics and a moderate migration advantage score may have a high enough migration suitability score (such as, for example, one that exceeds a threshold) so that the workload may also be identified as a good candidate for migration. Similarly, a workload with a mixture of high and low suitability metrics and a moderate-to-high migration advantage score may also have a sufficiently high migration suitability score to be identified as a good candidate for migration. As may be contemplated, the combinations of scores and metrics which may serve to identify a workload as a good candidate for migration described herein are merely illustrative examples and other such combinations of scores and metrics which may serve to identify a workload as a good candidate for migration may be considered as within the scope of the present disclosure.

In an illustrative example, a workload may specify the resource requirements for a service for processing user requests operating on, for example, four computer systems that run one or more applications configured to process user requests. Each of the computer systems may comprise (or correspond to the allocation of) one or more CPUs, system memory, disk I/O, network access and/or other such resources. In a typical day, the CPU for the servers may operate at a ten percent load from midnight to six in the morning, may ramp up from a ten percent to a ninety percent load from six in the morning until nine in the morning, may drop down to fifty percent for much of the day, may ramp back up again to a ninety percent load between four and six in the evening and may drop down to the ten percent load from six until midnight. In this example, the memory usage may follow a similar pattern, the disk storage may remain relatively constant except during a nightly backup and the network access may hover at between three and five percent (but with spikes) throughout the day. In such a system, the CPU and memory usage may have a high standard deviation and thus a high metric, the disk storage may have a low standard deviation and thus a low metric (particularly if the single spike in usage is discounted) and the network may be somewhere in the middle. Such a system may be a good candidate for migration based only on these metrics. The example system may also be a good candidate for migration considering the TCO for maintaining the four servers and the backup system within the customer datacenter environment against the TCO of maintaining, for example, one computing resource service provider instance for twelve hours a day (i.e., during the night), ramping up to four instances from six in the morning until nine in the morning and again from four in the afternoon to six in the evening, and maintaining two instances for much of the day if, depending on the TCO-to-cost comparison, the cost of the computing resource service provider instances may yield a greater ROI. The example system, once identified may then be migrated.

Techniques for utilizing computer system capabilities to analyze resource usage for workloads associated with computer system services, to use that analysis to identify candidate workloads that may at least be partially migrated from customer datacenter environments to computing resource service provider environments are described herein. As used herein, the term "customer datacenter environment" may refer to a computer system environment deployed within a customer-owned, customer-operated or customer-supplied datacenter comprising one or more computer systems and resources associated with those one or more computer systems. As used herein, the term "computing resource service provider environment" may refer to a computer system environment operated by a service provider that provides access to resources as a service to customers, such as the customer. The computer systems and/or computer system services may include, but may not be limited to, computer systems comprising distributed sets of a plurality of components, subsystems, entities and resources and may further include, but may not be limited to, virtualized and/or non-virtualized components, subsystems, entities and resources.

In such distributed and/or virtualized systems, the plurality of components, subsystems and/or computer entities (referred to herein simply as "entities," "components" or "instances") may include a collection of one or more instances of a number of different types and configurations of computer system entities. Such computer system entities may include, but not be limited to, load balancers, scaling groups, host computer systems, database systems, database storage, block storage systems, block storage, data domains and/or other such computer system entities. The computer system entities may utilize computer system resources including, but not limited to, CPUs, memory, disk I/O, disk storage, application resources, other hardware resources, virtual hardware resources and other such computer system resources.

The resources associated with a computer system may be measured to at least determine the usage of the resources over the measurement time period. In some embodiments, resource usage may be measured by the operating system, or by a process controlled by the operating system or by some other such measurement process. For example, CPU usage may be measured and recorded over the course of a minute, an hour, a day or some other such time period by monitoring the CPU and recording usage values. In some embodiments, resource usage may be continually monitored. In some embodiments, resource usage may be sampled and/or otherwise periodically monitored. Other resource usage measurements may also be gathered for resources including, but not limited to, memory usage, total memory load, storage requirements, storage bandwidth requirements, network usage, network bandwidth requirements, application usage, system usage, hardware usage and/or other such resources. As may be contemplated, the resource usage measurements described herein are illustrative examples, and other such resource usage measurements may be considered as within the scope of the present disclosure.

The resource usage measurements may be analyzed individually and/or in aggregate to determine whether at least a part of a selected resource, entity, application, computer system or workload may be a good candidate for migration from a customer datacenter environment to a computing resource service provider environment. The resource usage measurements may also be analyzed to determine whether at least a part of a selected resource, entity, application, computer system or workload may be a good candidate for migration from a computing resource service provider environment to a customer datacenter environment (i.e., a reverse migration). In some embodiments, the resource usage measurements may include one or more of CPU usage, memory usage and disk I/O. In such embodiments, the resource usage measurements may be recorded over the course of the execution of an entity, application, computer system or workload or may be recorded over a sampling period.

The resource usage measurements may be gathered for resources including, but not limited to, central processing unit ("CPU") usage, memory usage, disk input and output ("I/O") usage and other such resources. One or more metrics relating to these resource measurements may be determined, based at least in part on the measurements. For example, a mean (or average) value may be computed for the resource usage over the course of the measured time period. A standard deviation may also be computed based on the mean, which may provide a measurement of the variation of the resource usage from the mean. When resource usage measurements are close to the mean, the standard deviation is low. When resource usage measurements are far from the mean, the standard deviation is high. A standard deviation may be calculated by computing a mean value for a collection of values (i.e., resource measurements), squaring the difference of each value from the mean value, computing the average of the collection of squared differences and computing the square root of that average. For example, the mean of a set of values {1, 2, 3, 4 and 5} is three and the standard deviation is the square root of the average of the square of the differences, which is the square root of two. A standard deviation may also be calculated using other methods which may be chosen based on the data used.

A standard deviation may be scaled and made unitless (converted into a numeric value) by dividing the standard deviation by the mean value in order to facilitate effective comparisons between different resource measurements. For example, CPU usage may be measured in instructions executed per second ("IPS") or more commonly, millions of instructions executed per second ("MIPS") and may be on the order of about one-hundred thousand MIPS. Memory usage may be measured in gigabytes ("GB") and may be on the order of ten GB. Disk I/O may be measured in a variety of ways and may use a variety of units including, but not limited to, queue size (bytes), I/O wait time (milliseconds), read throughout (bytes per second), write throughput (bytes per second) or a combination of these and/or other such measurements. By dividing the standard deviation by the mean, a unitless value, typically between zero and one may be obtained. Other metrics may be used to determine whether a workload is a suitable candidate for migration. For example, a workload that has a near constant resource requirement, but one which operates on a system with vastly more resources than are required may be a good candidate based solely on a high return on investment as described herein below. Additionally, metrics may be aggregated or combined such as, for example, by aggregating metrics across multiple related processes that together constitute a workload. Similarly, some portions of workloads may be better suited to migration than others. As may be contemplated, the computations for determining metrics for computer resource usage and the weightings and/or evaluations of those metrics described herein are illustrative examples, and other such computations for determining metrics for computer resource usage and the weightings and/or evaluations of those metrics may be considered as within the scope of the present disclosure.

The suitability of a particular workload for migration may be further determined by evaluating the costs associated with operating a workload in a customer datacenter environment and comparing those costs to costs associated with operating a workload in a computing resource service provider environment. Costs associated with operating a workload in a customer datacenter environment may include costs of owning computer system equipment, costs of operating computer system equipment, costs of maintaining computer system equipment or other such costs. In some embodiments, the costs may include more than monetary costs such as, for example, power requirements, space requirements and/or other such requirements. In some embodiments, the costs may be amortized across multiple applications or workloads. The computation of the TCO for a particular workload may include customer-estimated costs, customer-computed costs, automatically generated costs, other estimated costs, pro-rated (or amortized) costs, predicted costs or combinations of these and/or other such costs. Similarly, costs associated with operating a workload in a computing resource service provider environment may include costs of instances, costs for storage, costs based on instance type or location and/or other such costs. The costs of instances may be based on an estimated number of instances, an evaluation of the best type of instance to use, values based on instance locations and/or other such instance costs.

An identified workload which has a lower cost of operation within a computing resource service provider environment than the TCO for customer datacenter operation may have a positive ROI, further indicating that migration may be desirable. A TCO and/or a cost for computing resource service provider operation may be based on automatically calculated costs, on customer-provided costs, on estimated costs or on combinations of these and/or other such costs. In some embodiments, a TCO and/or a cost for computing resource service provider operation may include fixed as well as ongoing costs. In such embodiments, calculations that determine the desirability of migration may include calculations of a break-even point where the TCO exceeds the cost for computing resource service provider operation or vice versa. In some embodiments, a customer may not wish to provide a TCO. In such embodiments, the workload analyzer may provide the customer with a cost for operation in the computing resource service provider environment and the customer may provide the ROI calculation based at least in part on that cost. In some embodiments, costs associated with a migration may not be easily quantifiable. For example, a workload hosted in a customer datacenter may provide lower network latency than a workload operating within a computing resource service provider for some portion of the users, which may lead to a degradation of the user experience for those users. Conversely, the computing resource service provider workload may provide lower network latency for some other portion of the users, which may lead to an improvement of the user experience for those users.

The functionality to identify workloads for migration based at least in part on the resource usage metrics and evaluate resource costs may be provided by an application or browser such as a workload browser. The workload browser, which may be configured to open and/or otherwise select workloads, may also be configured to gather resource usage data, calculate resource usage metrics, identify workloads that are suitable candidates for migration and/or determine costs and returns. Workloads that are suitable candidates for migration may be fully or partially migrated from a customer datacenter environment to a computing resource service provider environment (or vice versa) using workload migration techniques such as creating instances, migrating applications, transferring data, installing device drivers, instantiating storage, creating load balancers, building instance templates for instantiation by load balancers and/or other such migration techniques. Workloads may be partially migrated by, for example, migrating a portion of the workload functionality from one location to another. For example, a workload which is comprised of a plurality of applications working in concert may have a portion of the plurality of applications migrated and a portion of the plurality of applications not migrated. In some embodiments, candidate workloads may be fully or partially migrated using functionality implemented by the workload browser such as by selecting a workload and initiating migration processing by, for example, pressing a button to initiate migration.

FIG. 1 illustrates an example environment 100 where an application running on a computer system within a customer datacenter environment may be identified as a suitable candidate for migration to a computer system within a computing resource service provider environment, in accordance with at least one embodiment. An application 102 may be running on a computer system 104 within a customer datacenter environment 106. The application 102 may be a single application, or may be a combination of a plurality of applications operating in concert to, for example, provide a service to users of the computer system 104. An analysis 118 of the application may be performed by executing one or more executable instructions within an analysis service 116. The analysis service 116 may be configured to evaluate the resource usage of the application 102 based at least in part on one or more metrics obtained from the application 102, from the computer system 104 and/or from the customer datacenter environment 106 and, based at least in part on that evaluation, may determine whether the application 102 is a suitable candidate for migration.

An application 102 that is identified as a suitable candidate for migration may have one or more operations executed which perform a migration 108 of the application 102 from a customer datacenter environment 106 to a computing resource service provider environment 110. The one or more operations which, when executed, perform a migration 108 of an application 102 from a customer datacenter environment 106 to an computing resource service provider environment 110 include, but may not be limited to, instantiating a virtual machine 112 in the computing resource service provider environment 110, installing an application 114 on the virtual machine such that the application 114 is configured to perform the functionality of the application 102, migrating data from the customer datacenter environment 106 to the computing resource service provider environment 110, installing device drivers on the virtual machine 112, instantiating a load balancer within the computing resource service provider environment 110 and/or other such migration operations.

Figure 2:
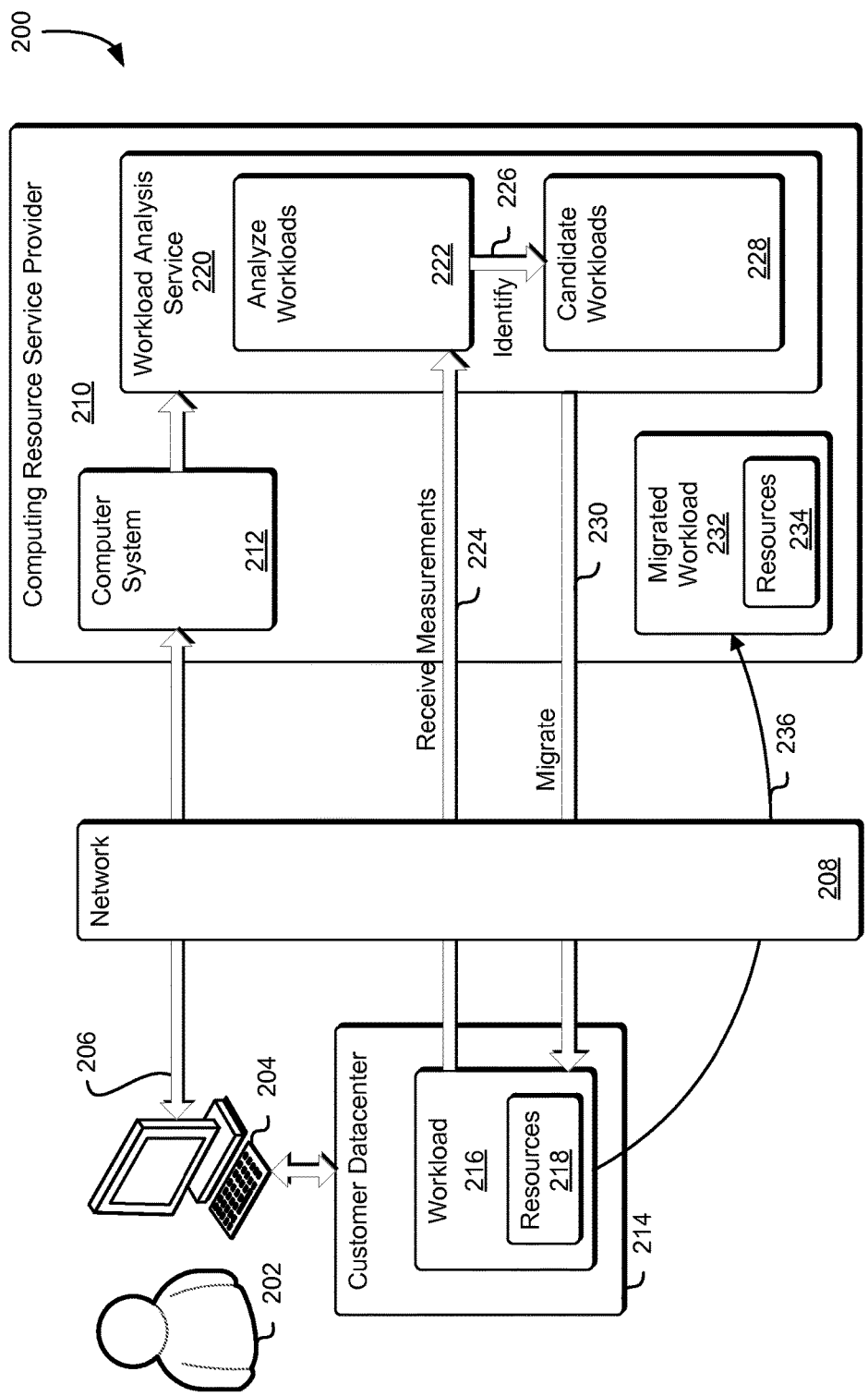
FIG. 2 illustrates an example environment where a workload running in a customer datacenter environment may be identified and selected for migration in accordance with at least one embodiment.

FIG. 2 illustrates an example environment 200 where a workload running in a customer datacenter environment may be identified and selected for migration to a computing resource service provider environment as described herein at least in connection with FIG. 1 and in accordance with at least one embodiment. A user 202 may make a connection 206 to a computer system 212 through a computer system client device 204 and select a workload 216 from one or more workloads running within a customer datacenter environment 214. The workload 216 may be selected to at least determine whether the workload 216 may be a suitable candidate for migration from the customer datacenter environment 214 to the computing resource service provider environment. The computer system 212 may be operating within the computing resource service provider 210, or may be operating within the customer datacenter environment 214 or may be operating within some other computer system environment. In some embodiments, the computing resource service provider 210 may provide a distributed, virtualized and/or datacenter environment within which one or more applications, processes, services, virtual machines and/or other such computer system entities may be executed. In some embodiments, the customer datacenter environment may provide a distributed, virtualized and/or datacenter environment within which one or more applications, processes, services, virtual machines and/or other such computer system entities may be executed. In some embodiments, the user 202 may be a person, or may be a process running on one or more remote computer systems, or may be some other computer system entity, user or process. The command or commands to connect to the computer system instance may originate from an outside computer system and/or server, or may originate from an entity, user or process on a remote network location, or may originate from an entity, user or process within the computing resource service provider, or may originate from a user of the computer system client device 204, or may originate as a result of an automatic process or may originate as a result of a combination of these and/or other such origin entities. In some embodiments, the command or commands to initiate the connection 206 to the computing resource service provider 210 may be sent to the computer system 212, without the intervention of the user 202. The command or commands to initiate the connection 206 to the computer system 212 may originate from the same origin as the command or commands to connect to the computing resource service provider 210 or may originate from another computer system and/or server, or may originate from a different entity, user or process on the same or a different remote network location, or may originate from a different entity, user or process within the computing resource service provider, or may originate from a different user of a computer system client device 204, or may originate as a result of a combination of these and/or other such same and/or different entities.

The user 202 may request connection to the computing resource service provider 210 via one or more connections 206 and, in some embodiments, via one or more networks 208 and/or entities associated therewith, such as servers connected to the network, either directly or indirectly. The computer system client device 204 that may request access to the computer system 212 may include any device that is capable of connecting with a computer system via a network, including at least servers, laptops, mobile devices such as smartphones or tablets, other smart devices such as smart watches, smart televisions, set-top boxes, video game consoles and other such network-enabled smart devices, distributed computer systems and components thereof, abstracted components such as guest computer systems or virtual machines and/or other types of computing devices and/or components. The one or more networks 208 may include, for example, a local network, an internal network, a public network such as the Internet, a wide-area network, a wireless network, a mobile network, a satellite network, a distributed computer system with a plurality of network nodes or other such networks. The network may also operate in accordance with various protocols, such as those listed below, Bluetooth, WiFi, cellular network protocols, satellite network protocols and/or others.

The computing resource service provider 210 may provide access to one or more host machines as well as provide access to computer services such as virtual machine (VM) instances, automatic scaling groups, file-based database storage systems, block storage services, redundant data storage services, data archive services, data warehousing services, user access management services, content management services and/or other such computer system services as may be running thereon. The computing resource service provider 210 may also provide access to computer system resources such as user resources, policy resources, network resources and/or storage resources. In some distributed and/or virtualized computer system environments including, but not limited to, the customer datacenter environment 214 and/or the computing resource service provider 210, the computer system resources may be physical devices, virtual devices, combinations of physical and/or virtual devices or other such device embodiments. In some embodiments, host machines may be physical machines located within the distributed and/or virtualized computer system environment. In some embodiments, the host machines may be guest virtual machines operating on physical machines located within the distributed and/or virtualized computer system environment.

Commands may be issued by the user 202 via the connection 206 to direct the computer system 212 to analyze a workload 216 of one or more workloads running within the customer datacenter environment 214. In some embodiments, the functionality to analyze a workload 216 may be performed by a service such as the workload analysis service described herein which may be operating within an environment provided by the computing resource service provider. In some embodiments, the functionality to analyze a workload 216 may be performed by a service such as the workload analysis service described herein which may be operating within an environment provided by the customer. In some embodiments, the functionality to analyze a workload 216 may be provided by a service such as the workload analysis service described herein which may be configured as an application and/or process such as, for example, a plug-in that is configured to provide such functionality. In some embodiments, the functionality to analyze a workload 216 may be provided by a service such as the workload analysis service described herein in response to one or more commands including, for example, API calls, library calls or some other such command methodology.

The commands may be issued to a workload analysis service 220 which may be configured to analyze workloads 222 by, for example, receiving measurements 224 from the workload 216 via network 208. Receiving measurements 224 may include receiving measurements of one or more resources 218 associated with workload 216. The workload analysis service may receive measurements 224 such as measurements of CPU load, memory usage, disk I/O and other such measurements. The workload analysis service 220 may determine one or more metrics associated with the measurements and, based on one or more suitability criteria such as the suitability criteria described herein above, may identify 226 one or more candidate workloads 228 for migration. Upon identifying one or more candidate workloads 228, the workload analysis service may issue one or more requests to migrate 230 a workload such as workload 216 and/or the resources associated with the workload from the customer datacenter environment 214 to the computing resource service provider 210. The workload 216 may be migrated 236 to the migrated workload 232 and at least a portion of the resources 218 may be migrated 236 to the migrated resources 234.

Figure 3:
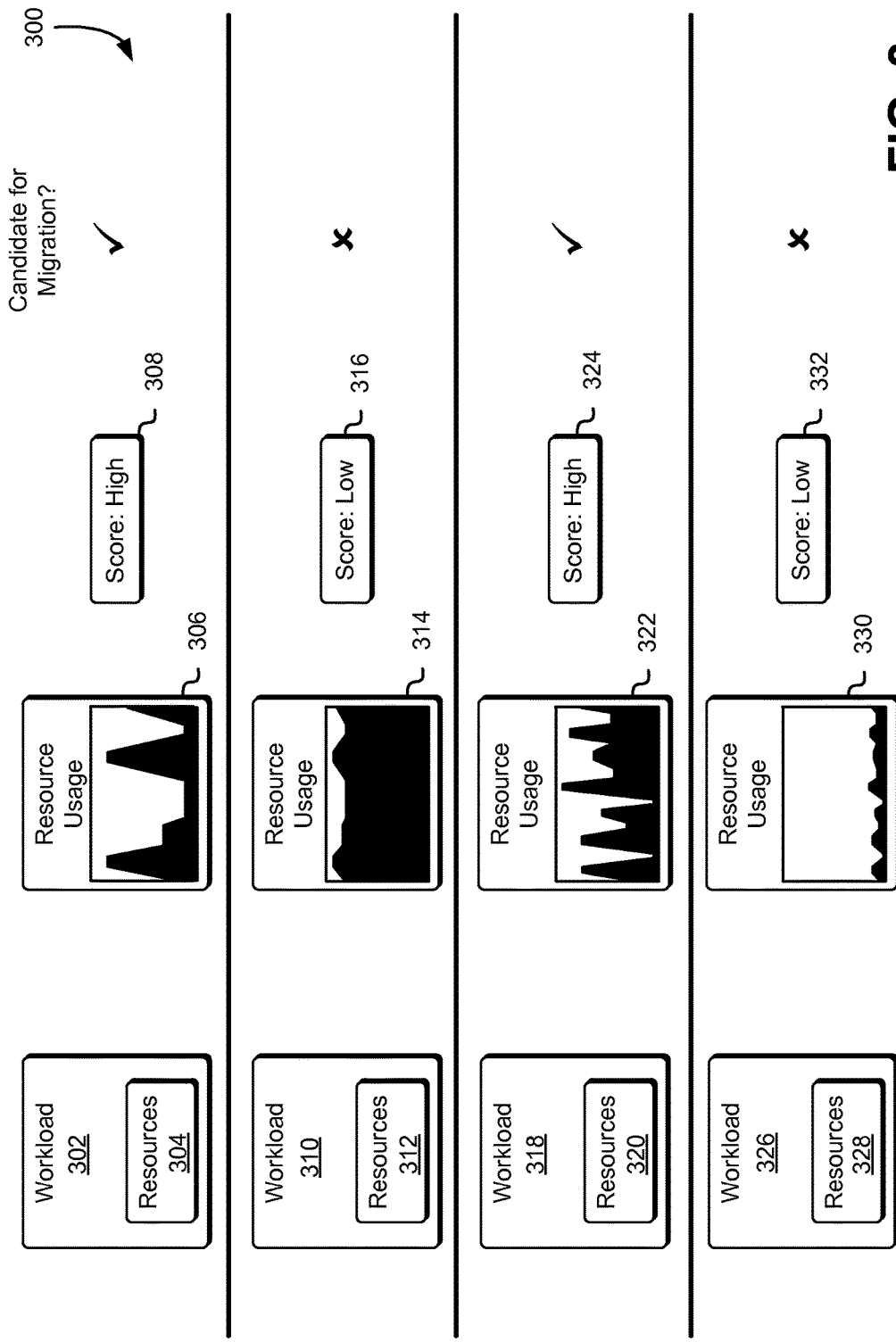
FIG. 3 illustrates an example environment where resource usage may be analyzed in accordance with at least one embodiment.

FIG. 3 illustrates an example environment 300 where resource usage for resources associated with one or more workloads may be analyzed as described herein at least in connection with FIG. 2 and in accordance with at least one embodiment. A workload 302 with resources 304 may have a resource usage graph 306 which indicates a large variation between the highest resource usage and the lowest resource usage. The resource usage graph 306 may be a graph of the usage of a resource such as CPU usage, memory usage, disk I/O, network bandwidth, hardware usage or a combination of these and/or other such resources. The resource usage graph 306 may be a record of the resource usage for one or more resources over a time scale such as an hour, or a day or some other time scale. The resource usage graph 306 may be analyzed and, as a result of the analysis, may have a relative or absolute score associated with the resource usage. The analysis of the resource usage graph 306 may be based on the mean, the standard deviation, the standard deviation divided by the mean, variance from optimal values or based on a combination of these and/or other such calculations. In the example illustrated herein, the resource usage graph 306 has a large variation between the highest resource usage and the lowest resource usage and thus, may have a high score 308 associated with the resource usage. Thus, the workload 302 may be a good candidate for migration as illustrated in FIG. 3.

A workload 310 with resources 312 may have a resource usage graph 314 which indicates a generally high resource value, but a small variation between the highest resource usage and the lowest resource usage. As with the resource usage graph 306, the resource usage graph 314 may be a graph of the usage of a resource such as CPU usage, memory usage, disk I/O, network bandwidth, hardware usage or a combination of these and/or other such resources and may be a record of the resource usage for one or more resources over a time scale such as an hour, or a day or some other time scale. The analysis of the resource usage graph 314 using one or more of the analysis methods described above may yield a low relative score 316 and thus, the workload 310 may not be a good candidate for migration.

A workload 318 with resources 320 may have a resource usage graph 322 with many spikes and with a large variation between the highest resource usage and the lowest resource usage. As with the resource usage graph 306 and resource usage graph 314, the resource usage graph 322 may be a graph of the usage of a resource such as CPU usage, memory usage, disk I/O, network bandwidth, hardware usage or a combination of these and/or other such resources and may be a record of the resource usage for one or more resources over a time scale such as an hour, or a day or some other time scale. The analysis of the resource usage graph 322 using one or more of the above analysis methods may yield a high relative score 324 and thus, the workload 318 may be a good candidate for migration.

Finally, a workload 326 with resources 328 may have a resource usage graph 330 with many spikes but with a small variation between the highest resource usage and the lowest resource usage. As with the previously mentioned resource usage graphs, the resource usage graph 330 may be a graph of the usage of a resource such as CPU usage, memory usage, disk I/O, network bandwidth, hardware usage or a combination of these and/or other such resources and may be a record of the resource usage for one or more resources over a time scale such as an hour, or a day or some other time scale. The analysis of the resource usage graph 330 using one or more of the above analysis methods may yield a low relative score 332 and thus, the workload 326 may not be a good candidate for migration.

Figure 4:
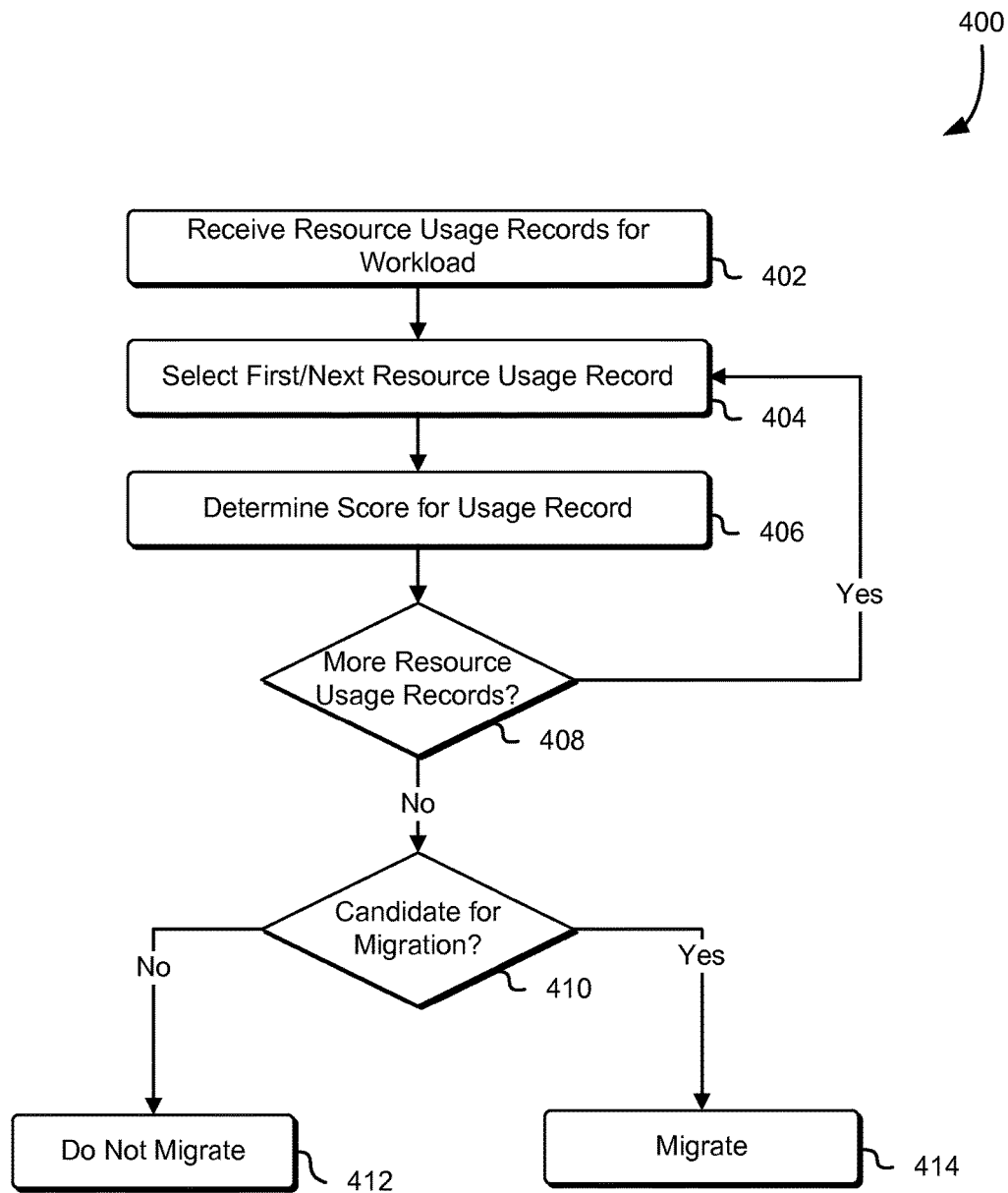
FIG. 4 illustrates an example process for analyzing workload resource usage in accordance with at least one embodiment.

FIG. 4 illustrates an example process 400 for analyzing workload resource usages and determining whether a workload is a good candidate for migration as described herein at least in connection with FIG. 2 and in accordance with at least one embodiment. A workload analysis service such as the workload analysis service 220 described herein in connection with FIG. 2 may perform at least a portion of the process illustrated in FIG. 4. Other entities operating with a computer system environment may also perform at least a portion of the process illustrated in FIG. 4 including, but not limited to, services, applications, modules, processes, operating system elements, virtual machine elements, network hardware, controlling domain elements (e.g., a hypervisor) or combinations of these and/or other such entities operating within the computer system environment.

A workload analysis service may receive a collection of resource usage records for a workload 402 representing the usage records for one or more resources associated with a workload. The workload analysis service may select the first resource usage record 404 and may determine a score 406 for the first resource usage record. The score may be determined as described herein above by, for example, computing the mean, the standard deviation or computing some other such value based on the first resource usage record. The workload analysis service may continue analyzing resource usage records while there are more resource usage records 408 to analyze. When there are no more resource usage records 408 to analyze, the workload analysis service may then determine whether the workload may be a good candidate for migration 410 based at least in part on the scores. If the workload is not a good candidate for migration, the workload may not be migrated 412. If the workload is a good candidate for migration, the workload may be migrated 414.

Figure 5:
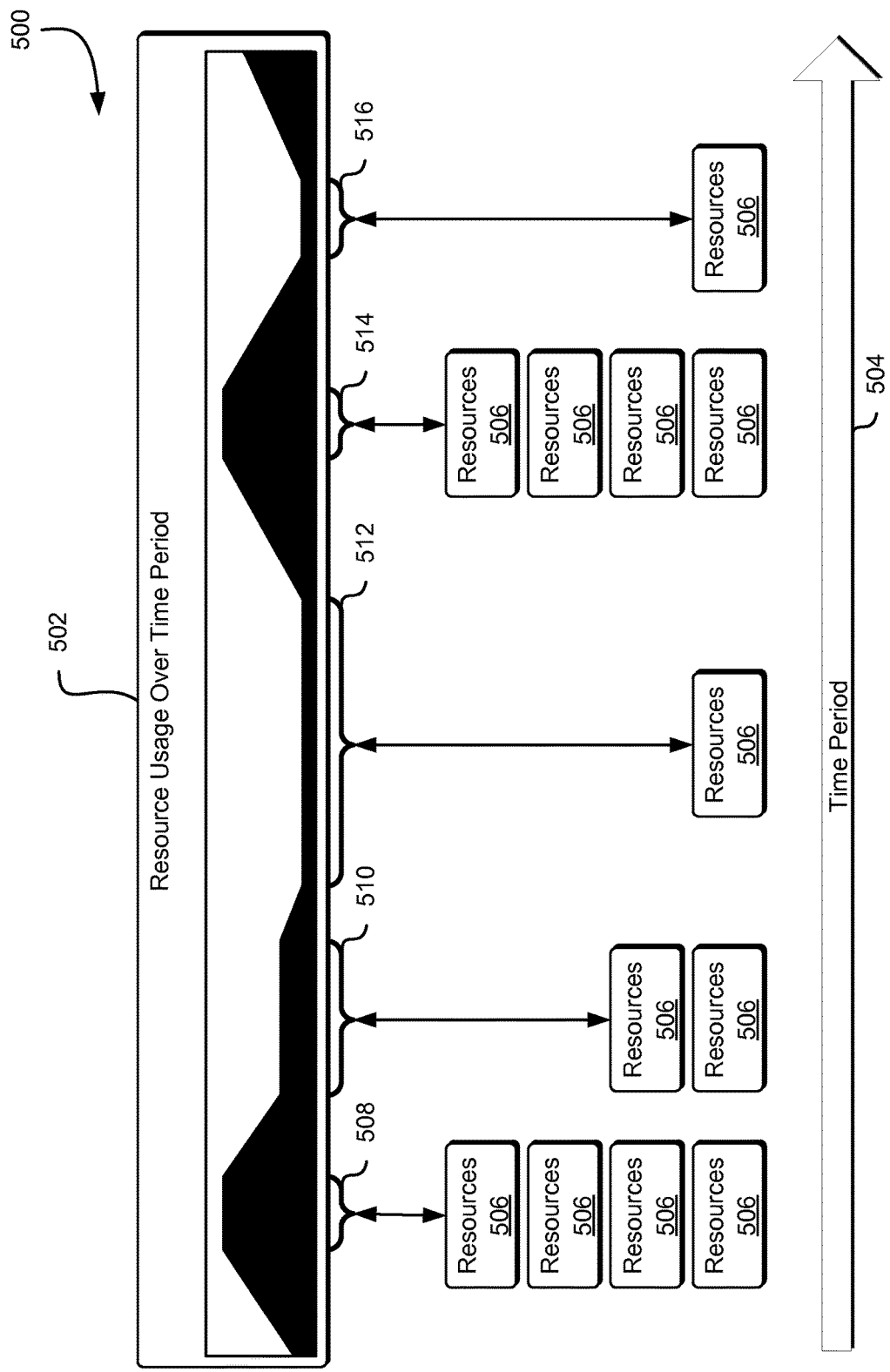
FIG. 5 illustrates an example environment where resource requirements may be estimated in accordance with at least one embodiment.

FIG. 5 illustrates an example environment 500 where required resources may be estimated based on a resource usage graph as described herein at least in connection with FIG. 2 and in accordance with at least one embodiment. Required resources may be estimated by a workload analysis service as part of determining the cost to migrate a workload. In the example illustrated in FIG. 5, a resource usage graph 502 showing resource usage over a time period such as an hour, a day, a week or some other such time period may indicate, for example, five different levels of resource requirements during the course of the time period 504. Initially, a moderate level of required resources 506 may be required, followed by ramp up to a time period 508 requiring a high level of resources 506. Later in the time period 504, a time period 510 requiring a moderate level of resources 506 may be followed by a time period 512 requiring a low level of resources 506. A later spike at time period 514 may require a high level of resources 506 followed by another time period 516 requiring another low level of resources 506. These variations in resource requirements may be used to determine costs to migrate a workload to a computing resource service provider environment as well as to determine TCO associated with hosting a workload in a customer datacenter environment.

Figure 6:
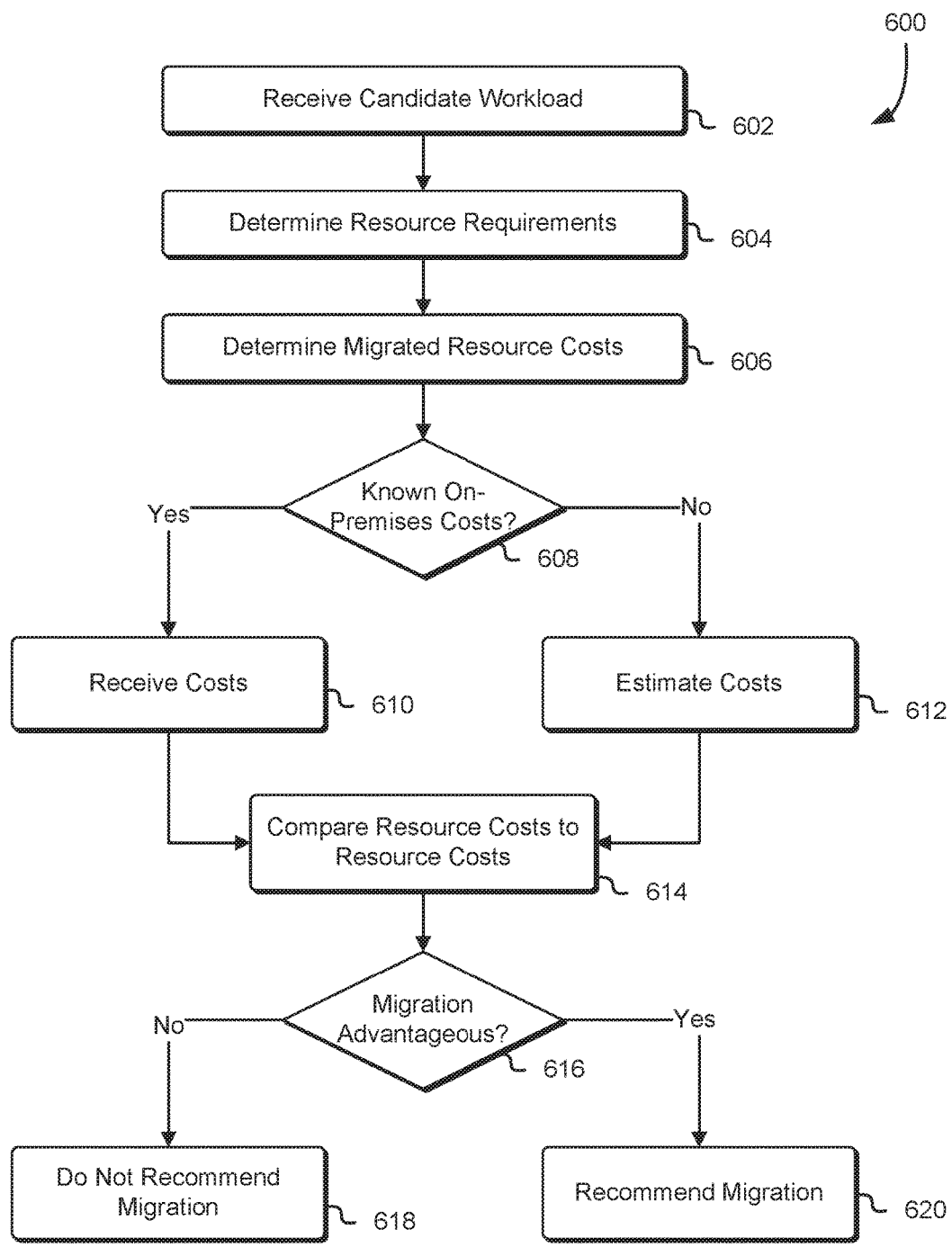
FIG. 6 illustrates an example process for total cost of ownership and return on investment associated with migrating a workload in accordance with at least one embodiment.

FIG. 6 illustrates an example process 600 for determining a TCO and/or an ROI associated with migrating a workload from a customer datacenter environment to a computing resource service provider environment as described herein at least in connection with FIG. 2 and in accordance with at least one embodiment. A workload analysis service such as the workload analysis service 220 described herein in connection with FIG. 2 may perform at least a portion of the process illustrated in FIG. 6. Other entities operating with a computer system environment may also perform at least a portion of the process illustrated in FIG. 6 including, but not limited to, services, applications, modules, processes, operating system elements, virtual machine elements, network hardware, controlling domain elements (e.g., a hypervisor) or combinations of these and/or other such entities operating within the computer system environment.

A workload analysis service may receive a candidate workload 602. A candidate workload 602 may be a workload that was previously identified as suitable for migration based on resource usage as described herein at least in connection with FIG. 2 and in accordance with at least one embodiment. The workload analysis service may then determine the resource requirements 604 for the workload as described herein at least in connection with FIG. 5 and in accordance with at least one embodiment and may determine migrated resource costs 606 including the costs associated with running the workload in the computing resource service provider environment.

The workload analysis service may then attempt to determine the costs associated with operating the workload within the customer datacenter environment which may be used as a basis for determining the TCO associated with operating the workload in a customer datacenter environment. If the costs associated with operating the workload within the customer datacenter environment are known 608, the workload analysis service may receive those costs 610 and may use those known costs to compare the resource costs associated with operating the workload in a computing resource service provider environment to the resource costs associated with operating the workload in a customer datacenter environment 614. This comparison may be based at least in part on the TCO of operating the workload in a customer datacenter environment and may yield an ROI measurement for the migration.

If it is not the case that the costs associated with operating the workload within the customer datacenter environment are known 608, the workload analysis service may perform one or more operations to estimate those costs 612 including, but not limited to, analyzing the customer datacenter environment, querying the user, using known values and/or using other such estimation methods. The workload may then use those estimated costs to compare the resource costs associated with operating the workload in a computing resource service provider environment to the resource costs associated with operating the workload in a customer datacenter environment 614. As before, this comparison may be based at least in part on the estimated TCO of operating the workload in a customer datacenter environment and may yield an ROI measurement for the migration. Finally, based at least in part on the actual and/or estimated ROI, the workload analysis service may determine if the migration is advantageous 616 and, if not, may not recommend migration 618. If the migration is advantageous 616, the workload analysis service may perform one or more operations to recommend migration 620.

Figure 7:
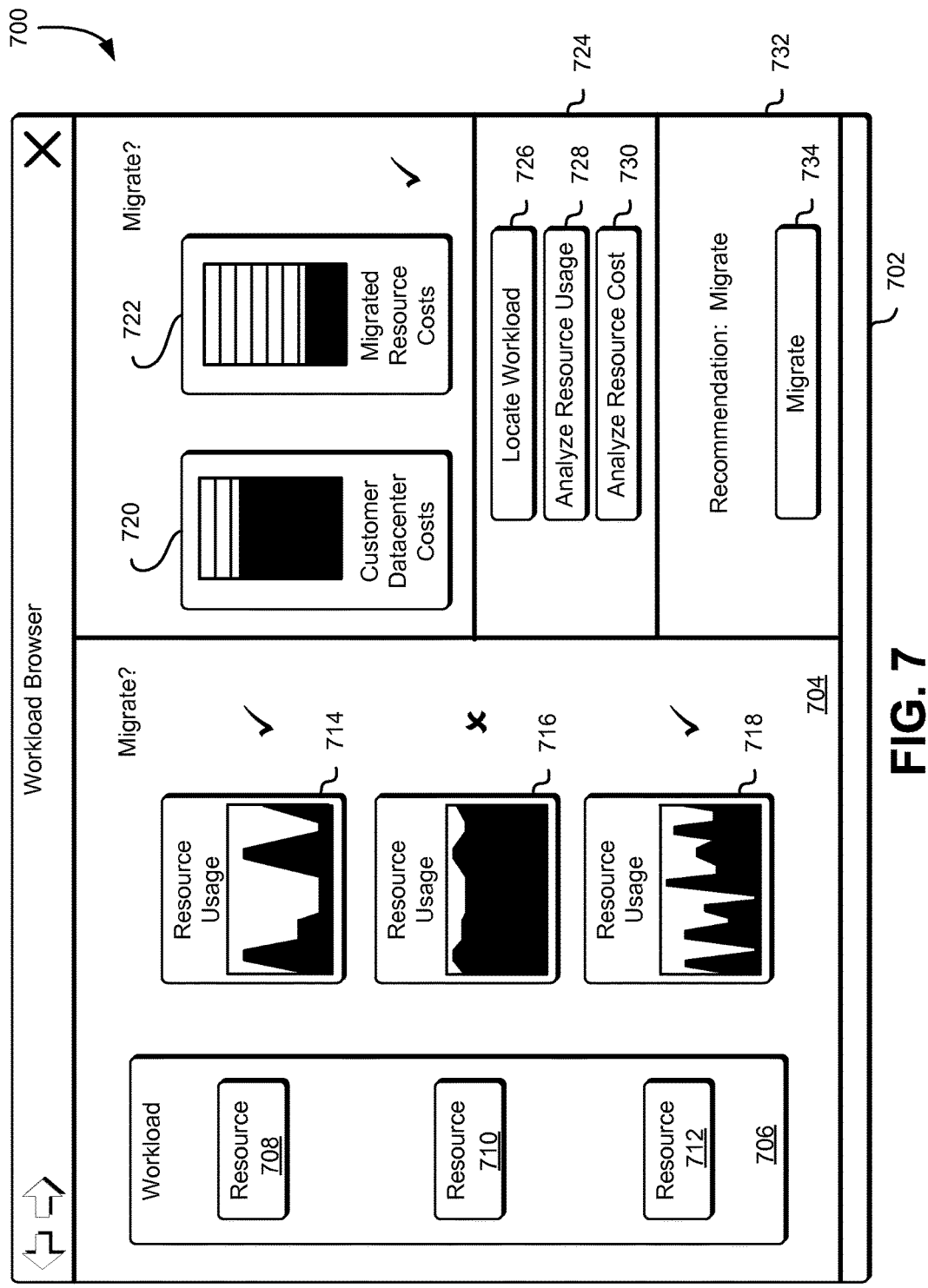
FIG. 7 illustrates an example environment where workloads may be analyzed and migrated in accordance with at least one embodiment.

FIG. 7 illustrates an example environment 700 where workloads may be analyzed and migrated as described herein at least in connection with FIG. 2 and in accordance with at least one embodiment. A workload browser 702 may be configured to perform one or more workload actions 724. For example, the workload browser 702 may perform an action to locate a workload 726 based on, for example, an application, a host, a uniform resource identifier ("URI") or some other such location. The workload with one or more associated resources may be represented in a workload display interface 704 which may be configured to display a representation of the workload 706.

The workload browser 702 may then perform an action to analyze the resource usage 728 of the workload using the analysis methods described herein at least in connection with FIG. 2 and in accordance with at least one embodiment. In the example illustrated in FIG. 7, the workload 706 may have a resource 708 with a resource usage graph 714 which may show a pattern of resource usage indicating that, with respect to resource 708, the workload 706 may be a good candidate for migration. In the example illustrated in FIG. 7, the workload 706 may have a resource 710 with a resource usage graph 716 which may show a pattern of resource usage indicating that, with respect to resource 710, the workload 706 may not be a good candidate for migration. In the example illustrated in FIG. 7, the workload 706 may have a resource 712 with a resource usage graph 718 which may show a pattern of resource usage indicating that, with respect to resource 712, the workload 706 may be a good candidate for migration.

The workload browser 702 may then perform an action to analyze the resource cost 730 associated with the resource costs associated with operating the workload within the customer datacenter environment 720 and migrated resource costs 722 (e.g., costs associated with migrating the workload to a computing resource service provider environment) and based at least in part on these costs, may further determine whether the workload 706 may be a good candidate for migration. Based on the analysis, the workload browser may display a recommendation 732 indicating whether the workload should be migrated and may also provide functionality to migrate 734 the workload. In some embodiments, the workload browser may display the results of the analysis which may then be provided to a user, process, service, application or the like which may then analyze the results of the analysis and make one or more recommendations for migration based at least in part on system policies, thresholds, metrics and/or other such considerations.

Figure 8:
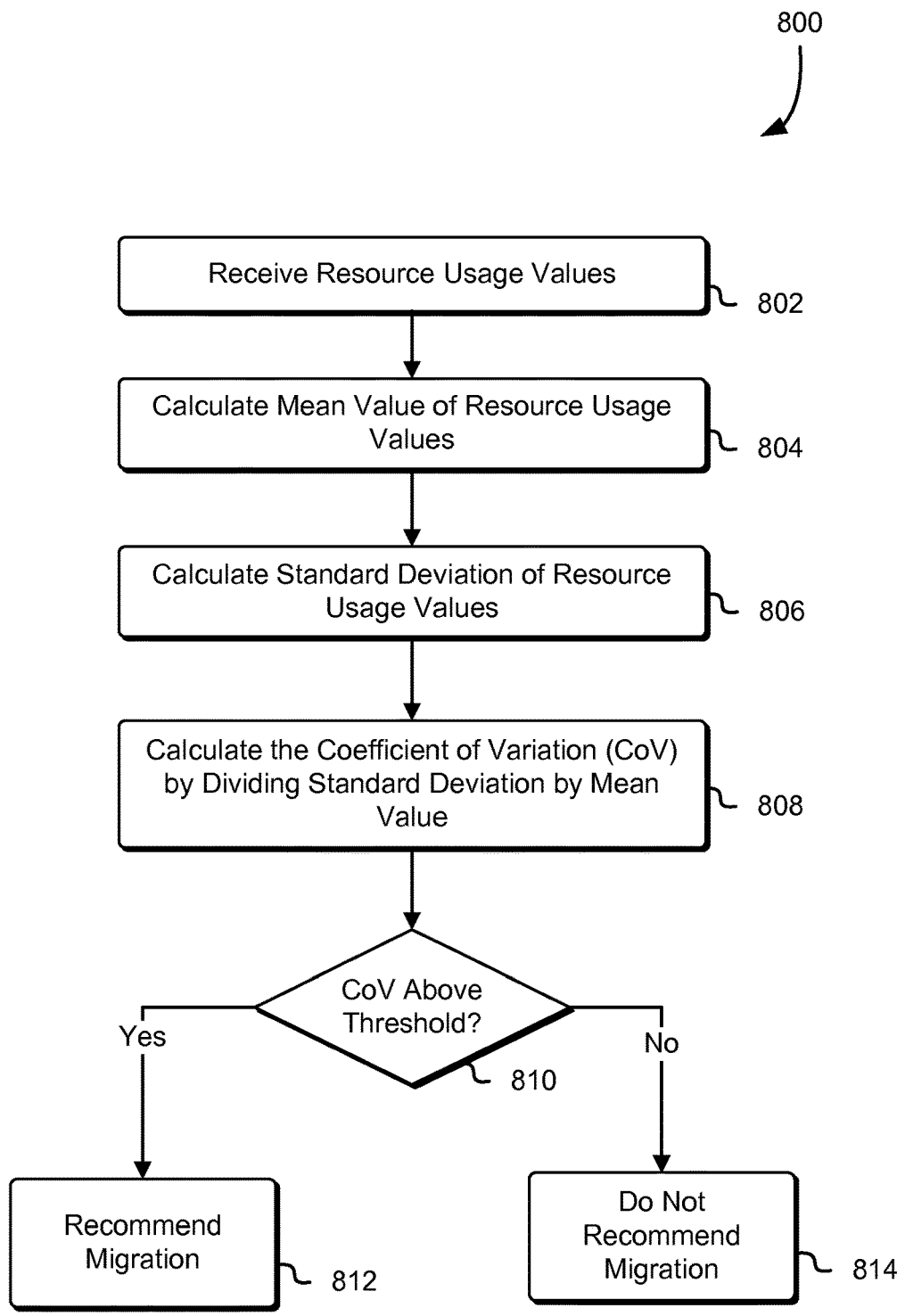
FIG. 8 illustrates an example process for calculating a coefficient of variation and for recommending migration based on that calculation in accordance with at least one embodiment.

FIG. 8 illustrates an example process 800 for calculating a coefficient of variation ("CoV") and for recommending migration of a workload based at least in part on that calculation as described herein at least in connection with FIG. 2 and in accordance with at least one embodiment. A workload analysis service such as the workload analysis service 220 described herein in connection with FIG. 2 may perform at least a portion of the process illustrated in FIG. 8. Other entities operating with a computer system environment may also perform at least a portion of the process illustrated in FIG. 8 including, but not limited to, services, applications, modules, processes, operating system elements, virtual machine elements, network hardware, controlling domain elements (e.g., a hypervisor) or combinations of these and/or other such entities operating within the computer system environment.

A collection of resource values 802 may be received and a mean value calculated for the collection of resource values 804. The mean value, or average value, is the total of all of the values, divided by the number of values. For example, the mean value of a set of values $\{1, 2, 3, 4$ and $5\}$ is fifteen divided by five, or three. A standard deviation may also be calculated 806 for the collection of resource values may also be calculated as described herein above. The standard deviation is the square root of the average of the square of the differences between the values and the mean. For the set of values $\{1, 2, 3, 4$ and $5\}$, this is the square root of the average of $\{4, 1, 0, 1$ and $4\}$ which is the square root of ten divided by five, or the square root of two. Next, a coefficient of variation 808 may be calculated by dividing the standard deviation (the square root of two) by the mean value (three). The coefficient of variation, which is slightly less than one-half, may then be compared to a threshold value 810. If the coefficient of variation is above that threshold, the workload may not be recommended for migration 812. If the coefficient of variation is below that threshold, the workload may not be recommended for migration 814.

Figure 9:
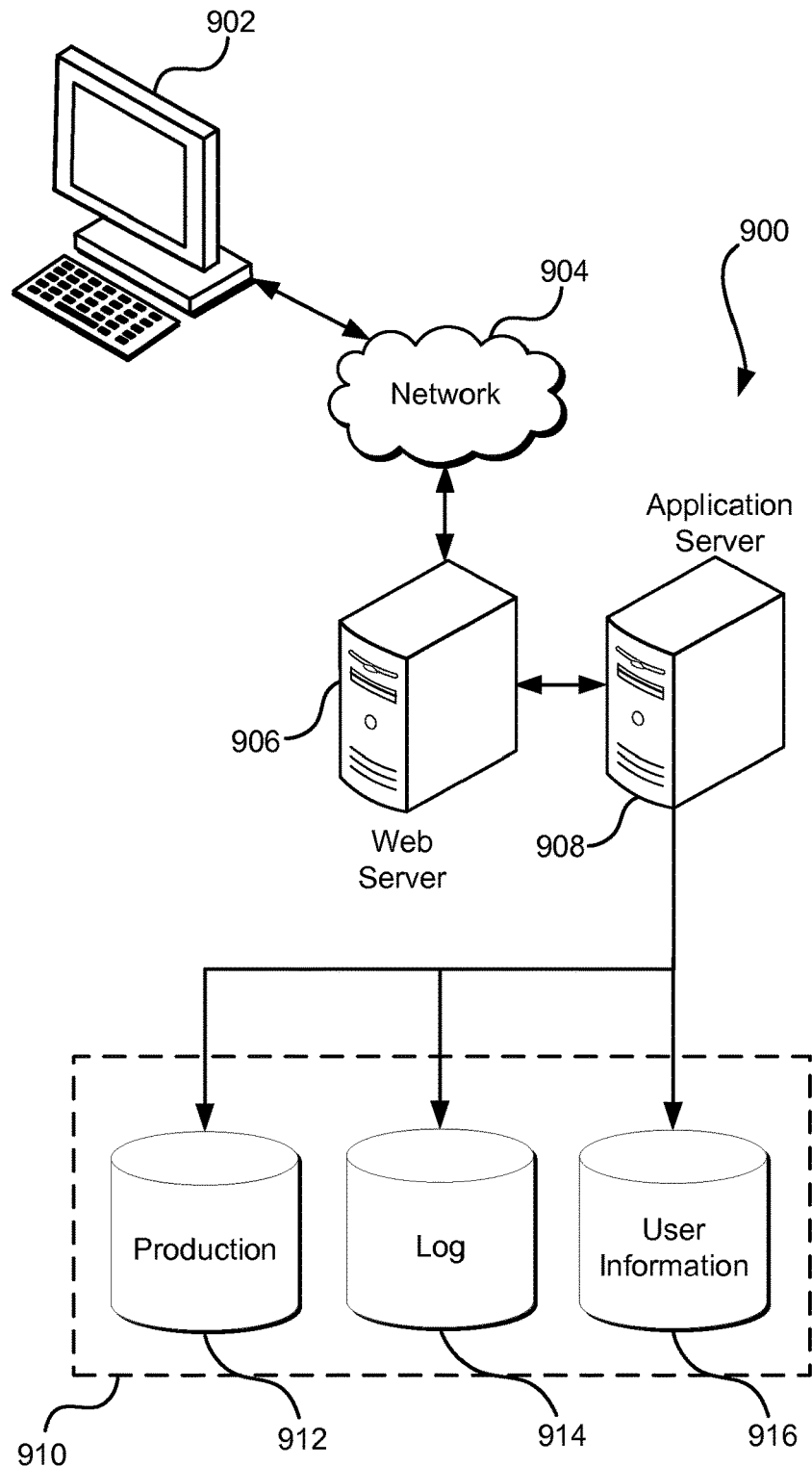
FIG. 9 illustrates an environment in which various embodiments can be implemented.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and/or receive requests, messages or information over an appropriate network 904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail.

Communication over the network can be enabled by wired or wireless connections and combinations thereof. In this example, the network includes the Internet, as the environment includes a web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 902 and the application server 908, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 910 can include several separate data tables, databases, data documents, dynamic data storage schemes and/or other data storage mechanisms and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. The application server 908 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UPnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
   for each candidate workload of a plurality of candidate workloads:
      receiving, from a client device, a resource usage profile associated with the candidate workload, the resource usage profile specifying a set of resource usage values associated with operating the candidate workload in a first operating environment, the set of resource usage values specifying one or more load measurements associated with one or more computer system resources, the first operating environment including computer hardware that is outside a control of a computer resource service provider;
      determining one or more scaled resource usage metrics based at least in part on a coefficient of variation, the coefficient of variation calculated by dividing a standard deviation of a subset of the set of resource usage values in the resource usage profile by a mean of the subset of the set of resource usage values in the resource usage profile;
      determining a migration recommendation for migrating the candidate workload from the first operating environment to a second operating environment based at least in part on:
         whether the coefficient of variation of the one or more scaled resource usage metrics exceeds a threshold; and
         a projected return on investment that is based at least in part on a comparison between:
            a first operation cost of operating the candidate workload in the first operating environment; and
            a second operation cost, the second operation cost being an estimated cost of operating the candidate workload in the second operating environment, wherein the second operation cost includes a migrated resource cost for migrating the candidate workload to the second operating environment, the second operating environment including virtualized computer instances that are provided as a service by the computing resource service provider; and
         a determination of suitability of migration of the candidate workload based at least in part on a result of the projected return on investment attaining a value relative to a second threshold; and
      providing, to be dynamically displayed in a graphical user interface of the client device, a representation of the candidate workload and the migration recommendation, the graphical user interface including functionality to initiate the migration of the candidate workload.

2. The computer-implemented method of claim 1, wherein the one or more load measurements include at least one of: central processing unit usage, memory usage, disk input/output usage, or network usage.

3. The computer-implemented method of claim 1, wherein the migration recommendation is based at least in part on a difference between the first operation cost and the second operation cost.

4. The computer-implemented method of claim 3, wherein the second operation cost is based at least in part on costs associated with instantiating computer system resources in the second operating environment.

5. The computer-implemented method of claim 1, wherein the first operation cost is based at least in part on at least one of:
   a cost automatically generated by the computing resource service provider, or
   a cost provided by an entity that manages the first operating environment.

6. The computer-implemented method of claim 1, further comprising initiating migration of the candidate workload as a result of receiving a selection via the graphical user interface that initiates the migration of the candidate workload.

7. The computer-implemented method of claim 1, wherein providing the representation includes providing a visualization that indicates that the migration is not recommended.

8. The computer-implemented method of claim 1, wherein as a result of the projected return on investment exceeding a second threshold, suitability is determined to be high.

9. The computer-implemented method of claim 8, wherein providing the representation includes providing a visualization that indicates that the suitability of the migration is high.

10. A system, comprising:
   at least one computing device that implements one or more services of a computing resource service provider, wherein, for each candidate workload of a plurality of candidate workloads, the one or more services:
      receive, from a client device, a resource usage profile associated with the candidate workload, the resource usage profile specifying a set of resource usage values associated with operating the candidate workload in a first operating environment, the set of resource usage values specifying one or more load measurements associated with one or more computer system resources, the first operating environment including computer hardware that is outside a control of a computer resource service provider;
      determine one or more scaled resource usage metrics based at least in part on a coefficient of variation, the coefficient of variation calculated by dividing a standard deviation of a subset of the set of resource usage values in the resource usage profile by a mean of the subset of the set of resource usage values in the resource usage profile;
      determine a migration recommendation for migration of the candidate workload from the first operating environment to a second operating environment based at least in part on:
         whether the coefficient of variation of the one or more scaled resource usage metrics exceeds a threshold; and
         a projected return on investment that is based at least in part on a comparison between:
            a first operation cost of operating the candidate workload in the first operating environment; and
            a second operation cost, the second operation cost being an estimated cost of operating the candidate workload in the second operating environment, wherein the second operation cost includes a migrated resource cost for the migration to the second operating environment, the second operating environment including virtualized computer instances that are provided as a service by the computing resource service provider; and
            a determination of suitability of the migration based at least in part on a result of the projected return on investment attaining a value relative to a second threshold; and
      provide, to be dynamically displayed in a graphical user interface of the client device, a representation of the candidate workload and the migration recommendation, the graphical user interface including functionality to initiate the migration of the candidate workload.

11. The system of claim 10, wherein the one or more load measurements specify a current load value as a percentage of a maximum load value for the one or more computer system resources associated with the set of resource usage values.

12. The system of claim 10, wherein the one or more load measurements are further based at least in part on calculating an absolute value of a difference between the set of resource usage values and an optimal usage value for the one or more computer system resources associated with the set of resource usage values.

13. The system of claim 10, wherein measurement is based at least in part on a difference between a first set of cost calculations associated with operating the candidate workload in the first operating environment and a second set of cost calculations associated with operating the candidate workload in the second operating environment.

14. The system of claim 13, wherein the first set of cost calculations associated with operating the candidate workload in the first operating environment are based at least in part on a costs of ownership associated with computer system equipment in the first operating environment.

15. The system of claim 10, wherein measurement is scaled based at least in part on weighting criteria.

16. A non-transitory computer-readable storage medium having stored thereon executable instructions that, as a result of execution by one or more processors of a computer system, cause the computer system to at least:
   for each candidate workload of a plurality of candidate workloads:
      receive, from a client device, a resource usage profile associated with the candidate workload, the resource usage profile specifying a set of resource usage values associated with operating the candidate workload in a first operating environment, the set of resource usage values specifying one or more load measurements associated with one or more computer system resources, the first operating environment including computer hardware that is outside a control of a computer resource service provider;
      determine one or more scaled resource usage metrics based at least in part on a coefficient of variation, the coefficient of variation calculated by dividing a standard deviation of a subset of the set of resource usage values in the resource usage profile by a mean of the subset of the set of resource usage values in the resource usage profile;
      determine a migration recommendation for migration of the candidate workload from the first operating environment to a second operating environment based at least in part on:
         whether the coefficient of variation of the one or more scaled resource usage metrics exceeds a threshold; and a projected return on investment that is based at least in part on a comparison between:
  a first operation cost of operating the candidate workload in the first operating environment and
  a second operation cost, the second operation cost being an estimated cost of operating the candidate workload in the second operating environment, wherein the second operation cost includes a migrated resource cost the migration to the second operating environment, the second operating environment including virtualized computer instances that are provided as a service by the computing resource service provider; and
  a determination of suitability of the migration based at least in part on a result of the projected return on investment attaining a value relative to a second threshold; and
provide, to be dynamically displayed in a graphical user interface of the client device, a representation of the candidate workload and the migration recommendation, the graphical user interface including functionality to initiate the migration of the candidate workload.

17. The non-transitory computer-readable storage medium of claim 16, wherein the one or more load measurements are based at least in part on central processing unit usage, wherein the one or more load measurements are based at least in part on memory usage, and wherein the one or more load measurements are based at least in part on disk input/output usage.

18. The non-transitory computer-readable storage medium of claim 16, wherein the one or more scaled resource usage metrics are further based at least in part on calculation of an absolute value of a difference between the set of resource usage values of one or more sets of resource usage values, and an optimal usage value for the one or more computer system resources associated with the set of resource usage values.

19. The non-transitory computer-readable storage medium of claim 16, wherein the migration recommendation is further based at least in part on a difference between one or more costs associated with operating the candidate workload in the first operating environment and one or more costs associated with operating the candidate workload in the second operating environment.

20. The non-transitory computer-readable storage medium of claim 16, wherein the migration recommendation further includes a recommendation to:
  instantiate, within the second operating environment, one or more applications associated with the candidate workload;
  transfer a subset of a set of data associated with the candidate workload to the second operating environment;
  install one or more device drivers on a destination computer system within the second operating environment; and
  instantiate a load balancing service on the destination computer system.

21. The non-transitory computer-readable storage medium of claim 16, wherein the migration recommendation is further based at least in part detecting one or more resource usage patterns, the one or more resource usage patterns based at least in part on one or more statistical calculations on the set of resource usage values.

* * * * *